(12) United States Patent
Flask

(10) Patent No.: US 10,615,894 B2
(45) Date of Patent: Apr. 7, 2020

(54) NETWORK TEST INSTRUMENT WITH TESTING SESSION ANALYSIS

(71) Applicant: VIAVI SOLUTIONS INC., Milpitas, CA (US)

(72) Inventor: Robert J. Flask, New Palestine, IN (US)

(73) Assignee: VIAVI SOLUTIONS INC., Milpitas, CA (US)

( * ) Notice: Subject to any disclaimer, the term of this patent is extended or adjusted under 35 U.S.C. 154(b) by 721 days.

(21) Appl. No.: 14/841,181

(22) Filed: Aug. 31, 2015

(65) Prior Publication Data

US 2017/0063478 A1 Mar. 2, 2017

(51) Int. Cl.
| | |
|---|---|
| *H04W 24/08* | (2009.01) |
| *H04B 17/309* | (2015.01) |
| *H04B 17/00* | (2015.01) |
| *H04B 17/23* | (2015.01) |
| *H04B 17/318* | (2015.01) |

(52) U.S. Cl.
CPC ....... *H04B 17/309* (2015.01); *H04B 17/0085* (2013.01); *H04B 17/23* (2015.01); *H04B 17/318* (2015.01); *H04W 24/08* (2013.01)

(58) Field of Classification Search
CPC .. H04B 17/0085; H04B 17/23; H04B 17/318; H04B 24/08; H04B 3/46; H04L 43/50
See application file for complete search history.

(56) References Cited

U.S. PATENT DOCUMENTS

| | | | |
|---|---|---|---|
| 5,805,585 A * | 9/1998 | Javitt | H04B 7/264 370/342 |
| 6,820,225 B1 | 11/2004 | Johnson et al. | |
| 6,856,138 B2 | 2/2005 | Bohley | |
| 7,249,286 B1 * | 7/2007 | Krishnan | H04L 41/0663 714/27 |
| 7,660,394 B1 * | 2/2010 | Blank | H04M 1/24 379/1.01 |
| 8,416,699 B1 * | 4/2013 | Lo | H04L 43/50 324/532 |
| 2004/0102931 A1 * | 5/2004 | Ellis | A61B 5/1038 702/188 |
| 2004/0153264 A1 * | 8/2004 | Teich | G01R 27/2647 702/65 |
| 2004/0251913 A1 | 12/2004 | Pharn et al. | |
| 2005/0001631 A1 | 1/2005 | Cautereels et al. | |
| 2006/0194547 A1 * | 8/2006 | Davis | H04L 1/0002 455/69 |
| 2007/0121663 A1 | 5/2007 | Yousefi et al. | |
| 2008/0109205 A1 * | 5/2008 | Nasle | G06F 17/5009 703/18 |

(Continued)

OTHER PUBLICATIONS

Robert Flask, "Return Path Maintenance Plan", A Five Step Approach to Ensuring a Reliable Communications Path, ACTERNA, 2005, 17 pages.

*Primary Examiner* — Kibrom T Hailu
(74) *Attorney, Agent, or Firm* — Mannava & Kang, P.C.

(57) ABSTRACT

A test instrument can be coupled to a test point in a network and measure signals in the network that are received via a port connected to the test point. The test instrument may connect to the network via multiple test points. The measurements of the signals received through one or more of the test points are correlated to detect a problem in the network and determine a suggested action.

20 Claims, 12 Drawing Sheets

(56) References Cited

U.S. PATENT DOCUMENTS

| | | | |
|---|---|---|---|
| 2009/0282292 A1* | 11/2009 | Squire | H04L 41/0631 714/39 |
| 2009/0312881 A1* | 12/2009 | Venturini Cheim | G01D 4/004 700/292 |
| 2011/0078453 A1* | 3/2011 | Mueck | H04L 9/0838 713/179 |
| 2012/0071197 A1* | 3/2012 | Hardacker | H04W 52/42 455/522 |
| 2012/0213259 A1* | 8/2012 | Renken | H04N 7/17309 375/222 |
| 2013/0060827 A1* | 3/2013 | Wegener | H03M 7/24 708/203 |
| 2014/0064459 A1* | 3/2014 | Wahl | H04L 12/2878 379/27.01 |
| 2014/0266238 A1 | 9/2014 | Furse et al. | |
| 2014/0344874 A1* | 11/2014 | Olsen | H04N 17/004 725/107 |
| 2015/0020129 A1* | 1/2015 | Chappell | H04N 17/004 725/107 |
| 2015/0257118 A1* | 9/2015 | Siomina | G01S 5/021 455/456.1 |
| 2017/0005723 A1* | 1/2017 | Prause | H04B 10/0793 |
| 2017/0034507 A1* | 2/2017 | Harris | H04N 17/004 |

* cited by examiner

700

```
┌─────────────────────────────────────────────┐
│ at least one signal from the network is     │
│ measured by the test instrument at one or   │
│ more test points to determine measured      │
│ characteristics                             │
│ 701                                         │
└─────────────────────────────────────────────┘
                      │
                      ▼
┌─────────────────────────────────────────────┐
│ measured characteristics are correlated to  │
│ detect one or more problems in the network  │
│ 101 and determine a suggested action for    │
│ each problem                                │
│ 702                                         │
└─────────────────────────────────────────────┘
                      │
                      ▼
┌─────────────────────────────────────────────┐
│ display the one or more problems and the    │
│ suggested action for each problem           │
│ 703                                         │
└─────────────────────────────────────────────┘
```

FIG. 7

| Measurements | Signal Quality |
|---|---|
| Test Taken at TAP | |
| Problems in the PLANT | |
| Digital<br>  DS Level<br>    MER<br>    BER<br>    Off Air/LTE in any band defined<br>    Echo<br>    Group Delay<br>    DS ICFR<br>    AGC Stress<br>    Modulator Stress<br>HUM<br>Analog<br>  Video level<br>  Audio 1/2<br>  C/N<br>  Hum<br>SmartScan<br>System Tilt<br>Max deviation<br>DOCSIS<br>  Packet Quality (loss only)<br>  DS Throughput<br>  Multipoint (# carriers)<br>  Nothing here | <br><br>X<br>X<br><br><br><br><br><br><br><br><br><br><br>X |
| Suggested Actions | |
| Verify connection between Instrument and TAP<br>Retest at TAP<br>Refer to Maintenance if re-test is bad<br>Refer AGC problem to Maintenance<br>Refer Modulator problem to Maintenance<br><br>IF there HAS NOT been a PASSING ingress scan at the GB<br>Test at GB to see if Ingress is present<br>If Ingress is OK at GB THEN replace or repair DROP and connections between GB and TAP<br>Retest Ingress Scan on the DROP at the TAP | X<br>X<br>X |

FIG. 9A

| Test Taken at GB | Signal Quality |
|---|---|
| Problems in the DROP | |
| D – TAP>>GB<br>GB<br>Digital<br>DS Level<br>MER<br>BER<br>Off/Air ingress in any band defined<br>Echo<br>GD<br>ICFR<br>AGC Stress<br>Modulator Stress<br>HUM<br>Analog<br>Video level<br>Audio 1/2<br>C/N<br>Hum<br>SmartScan<br>System Tilt<br>Max Deviation<br>DOCSIS<br>  Packet Quality (loss only)<br>  DS Throughput<br>  Multipoint (# carriers)<br>  Different number of DS bonded channels at TAP and GB<br>Inconsistency between DS loss at GB and est drop length at TAP | X<br>X<br><br><br><br><br><br><br><br><br><br><br><br>X   ← out of tolerance measured characteristics 912 |
| Suggested Actions | |
| IF there HAS NOT been a passing DS TEST AT TAP<br>Test at TAP to see if problem originated from network<br>Fix or Replace the DROP and the connections<br>Retest at GB to ensure fix<br>Refer AGC problem to Maintenance | X<br>X<br>X<br><br>suggested actions 914 for signal quality |

FIG. 9B

| Test Taken at CPE | Signal Quality |
|---|---|
| Problems in the HOME or DROP | |
| E - GB >>CPE | |
| CPE | |
| Digital | |
|   DS Level | |
|     MER | X |
|     BER | X |
|     Off/Air ingress in any band defined | |
|     Echo | |
|     GD | |
|     ICFR | |
|     AGC Stress | |
|     Modulator Stress | |
|     HUM | |
| Analog | |
|   Video level | |
|   Audio 1/2 | |
|   C/N | X |
|   Hum | |
| SmartScan | |
| System Tilt | |
| Max deviation | |
| DOCSIS | |
| Packet Quality (loss only) | |
| DS Throughput | |
| Multipoint | |
|   Different number of DS bonded channels at CPE and GB | |
|   Identify that there is an amplifier (i.e. levels at the cpe higher or same as GB) | |
| Suggested Actions | |
| IF there HAS NOT been a passing DS TEST AT GB | |
| Test at GB to see if problem originated in the home | X |
| Test at outputs of splitter network to isolate problem | X |
| Fix or Replace the connections or components | X |
| Retest at CPE to ensure fix | X |
| Refer AGC problem to Maintenance | |
| Refer Modulator problem to Maintenance | | out of tolerance measured characteristics 922 suggested actions 924 for signal quality

FIG. 9C

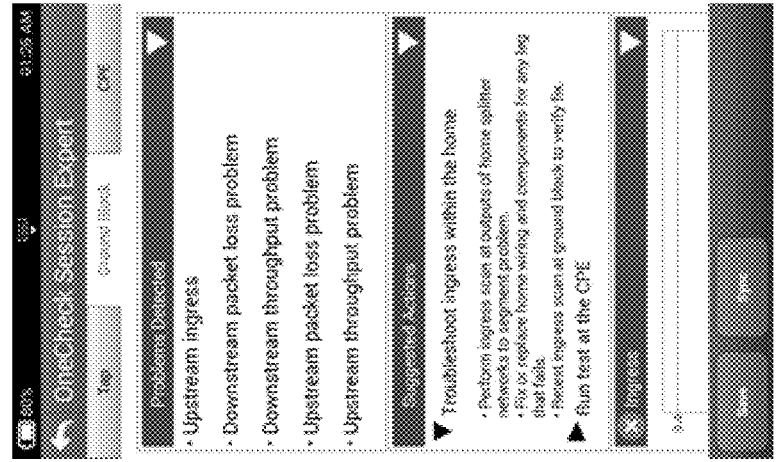
FIG. 12
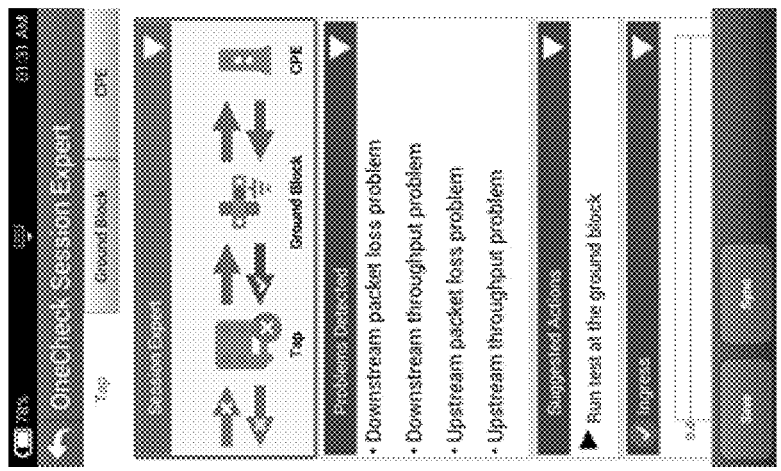
FIG. 13
FIG. 14

NETWORK TEST INSTRUMENT WITH TESTING SESSION ANALYSIS

BACKGROUND

Service provider networks typically delivers services, such as digital television, high-speed Internet, Voice-over-IP (VoIP), etc., to customer premises. Also, the networks typically carry bi-directional traffic. For example, a typical cable network is a two-way hybrid fiber-coaxial (HFC) network that supports point-to-multipoint transmission in the downstream direction using digital signals or a mix of analog and digital signals, and multipoint-to-point transmission in the upstream direction. Downstream signals, which carry broadcast digital TV signals, Internet traffic, etc., are distributed via a fiber optic connection from a head-end to a node that converts the optical signals to electrical signals and then distributes the signals to customer premises via a tree and branch coaxial cable distribution network termed 'cable plant'. Recently, service providers are running fiber to the customer premises to improve bandwidth. At the customer premises, terminal equipment supports the delivery of services, which may include video, data and voice services, to customers for example via cable modems. Upstream signals from the customer premises may carry phone and Internet traffic. The upstream signals propagate from the branches of the cable plant towards the headend of the network.

The upstream and downstream signals are prone to impairments originating at various locations in the network. There may be numerous devices, cable segments and connectors located between the fiber optic node and the customer premises equipment where defects can occur, and defects and impairments can occur at different customer premises that can impact the signal quality of other customer premises. Tracing a source of an impairment typically requires that a technician travels to different network locations and takes signal measurements to locate the sources of the impairments. Portable network testing devices currently used in the industry may help to identify certain types of defects by performing various signal measurements, such as spectral and noise measurements.

BRIEF DESCRIPTION OF DRAWINGS

Features of the present disclosure are illustrated by way of examples shown in the following figures. In the following figures, like numerals indicate like elements, in which:

FIG. 7 illustrates a method, according to an example of the present disclosure;

FIGS. 9A-C show portions of a table, according to examples of the present disclosure; and FIGS. 10-14 show screen shots that may be generated by the test instrument, according to examples of the present disclosure.

DETAILED DESCRIPTION

Figure 1:
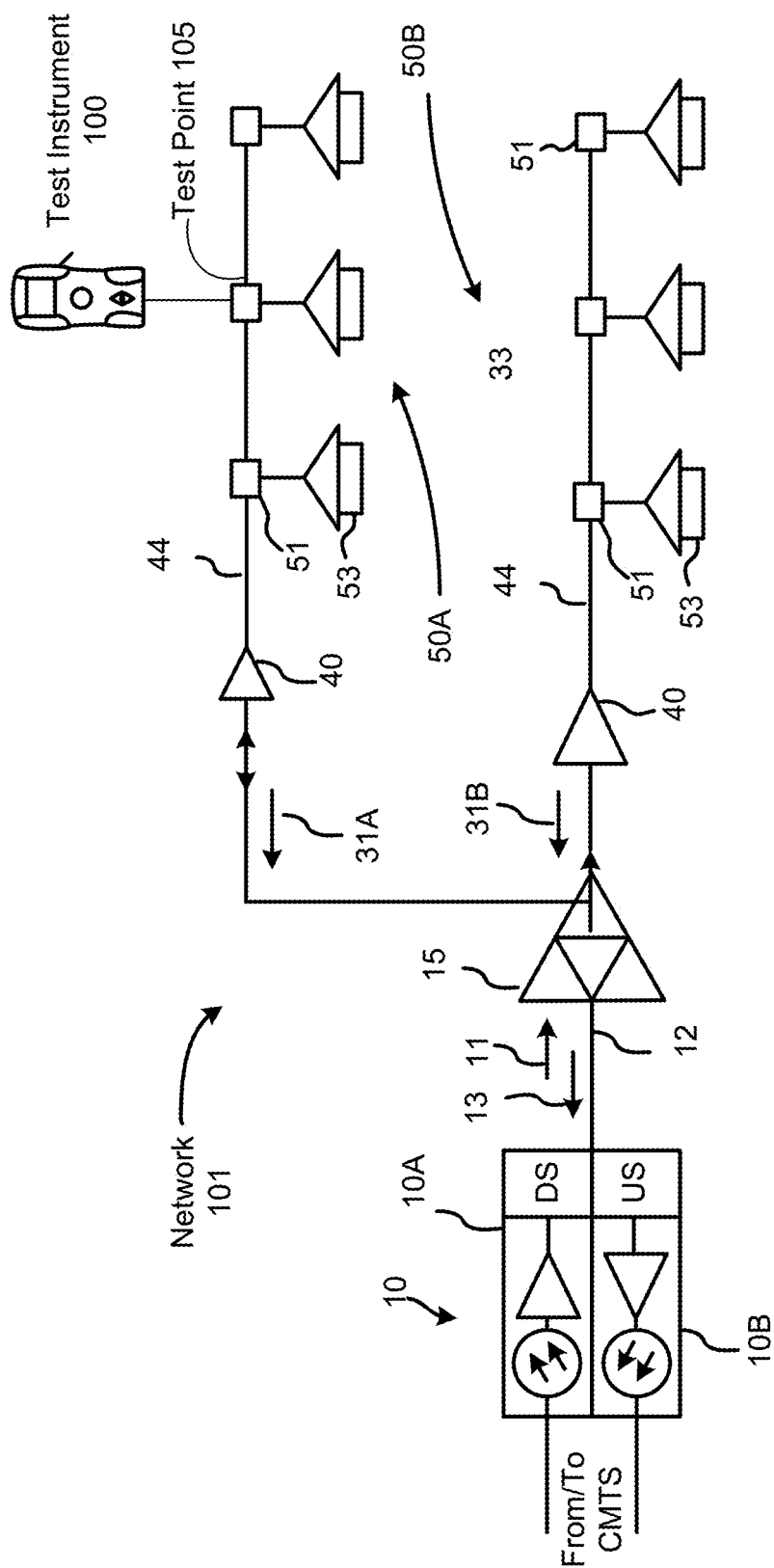
FIG. 1 illustrates a network with a test instrument connected at a test point, according to an example of the present disclosure.

For simplicity and illustrative purposes, the present disclosure is described by referring mainly to examples thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. Throughout the present disclosure, the terms "a" and "an" are intended to denote at least one of a particular element. As used herein, the term "includes" means includes but not limited to, the term "including" means including but not limited to. The term "based on" means based at least in part on.

A test instrument for networks can be connected to a network to measure parameters or characteristics of signals transmitted in the network. A test instrument for example is an apparatus that can connect to a network to receive signals transmitted in the network and measure characteristics of the signals. The test instrument may include a single port or multiple ports to connect to a single cable of the network or to simultaneously connect to multiple cables of the network to take measurements. The test instrument may be a handheld portable device or a larger device. The test instrument is also referred to as a network signal testing device.

The test instrument may be connected at various test points in the network to take signal measurements at each location, and multiple test points may be for the same customer premises. For each test point, testing includes measuring characteristics of signals received by the test instrument connected at the test point. Some examples of signal measurements performed by the test instrument may include spectral and noise measurements. The test instrument may use Frequency-Domain Reflectometry (FDR) and/or Time-Domain Reflectometry (TDR) to measure reflections, i.e., reflected signals. Reflectometry pulses (e.g., TDR or FDR pulses) may be generated and output via a port of the test instrument, and characteristics of the reflected signals, such as amplitude and reflection time, i.e., the time it takes for the pulse to return to the port, are measured to determine signal signatures, detect locations of impairments, etc. Signal levels are measured and displayed for example to verify proper levels arriving at the test point. Frequency response is measured for example to verify proper losses and to uncover any roll-off or sharp changes in response. Other characteristics may be measured as is further described below.

According to examples of the present disclosure, the test instrument can perform automated measurements in the background and correlate the measurements to detect a problem in the network and a suggested action. The measurements may be taken at multiple test points and the measurements from one or more of the test points can be correlated to detect a problem and suggested action. The suggested action may be to remedy the problem or to further verify or identify the problem. The test instrument for example includes a display, and the test instrument can display a description of problems that were identified based on correlated measurements and their suggested actions to solve the problems.

In an example, the test instrument can be used to measure signals in cable television systems, and the test points where the measurements are taken may include a tap which connects to the plant distribution network, a drop which is a cable going from the tap to the customer premises and which can be aerial or buried, a ground block which is a typical demarcation point that may be located on the side of the customer premises, and at the customer premises, such as to the end user outlet or Consumer Premise Equipment (CPE). These and/or other test points may be tested during a service installation or for troubleshooting a service ticket. A session for example is a set of tests performed for a specific job, work order, or service ticket. A user of the test instrument may initiate a new session for each job or work order. The job or work order identifier (ID), also referred to as a session ID, can be manually entered, automatically derived from a workforce management system, derived from a geographic location which may be determined from a Global Positioning System (GPS), derived from a time stamp, derived from a bar code scanned or other methods. The unique session ID is used to save measurements for a session, and to analyze and provide user feedback based on the tests taken at multiple locations for the session. The correlation of measurements to determine problems and suggested actions for the session may be performed by a processing circuit (e.g., processor) at the test instrument or by a remote computer which may be a cloud server or both locally and remotely.

The test instrument may include a processor, display, and data storage to store and display measurements and notifications, and to store signatures and other information and to correlate measurements for problem detection. The test instrument may include a communications interface, such as WiFi, Bluetooth, Ethernet, cellular, etc., to connect the test instrument to other devices via a network, and to transmit the stored data to other devices or computers. In one example, the test instrument is a portable, hand-held device that may connect to the cloud or any remote computer via the network interface. In other examples, the test instrument may be part of a larger system. The test instrument may be used to measure signals in any suitable type network, include cable television networks, optical networks, in-home wiring, etc.

FIG. 1 illustrates a test instrument 100 connected to a network 101 according to an example of the present disclosure. In this example, the network 101 is a cable TV network but the test instrument 100 may be used in other types of networks. Network 101 shown in FIG. 1 may be a local portion of a hybrid fiber coaxial (HFC) network that delivers Cable Television (CATV) signals, including digital TV signals and data and control signals, to end users at customer premises 53.

A fiber-optic node 10 of the cable network 101 for example includes a downstream (DS) optoelectronic converter 10A that converts downstream (DS) optical signals generated by a remote Cable Modem Termination System (CMTS) (not shown) into downstream electrical RF signals 11, and an upstream (US) electro-optic converter 10B that converts upstream (US) electrical RF signals 13 into US optical signals for upstream transmission to the remote CMTS. The fiber-optic node 10 is coupled via a coaxial cable 12 to a bidirectional amplifier 15, which amplifies the downstream RF signals 11 for distribution to first and second groups of customer premises 53A and 50B. The downstream RF signals 11 generated by the downstream optoelectronic converter 10A of the fiber node 10 are distributed to a plurality of end-of-the-line subscribers, or end users for example via one or more trunk coaxial cables 44 and subscriber taps 51. At the customer premises 53, the DS signals are demodulated using cable modems (not shown). One or more two-way trunk RF amplifiers 40 may further be provided in each trunk cable 44 to suitably amplify the upstream and downstream CATV signals on their way to and from the customer premises 53. The first and second groups of customer premises 50A and 50B may send upstream signals 31A and 31B, respectively, which may be combined by the bidirectional amplifier 110 into the upstream RF signal 13 propagating towards the fiber node 106 for delivering to the remote CMTS at the headend (not shown). The cable network 101 may serve a large number of customer premises, which may be connected by taps 51 to a plurality of different cable trunks 44 at a plurality of different locations. The trunk cables 44 may be buried in the ground or they may be elevated above the ground on utility poles, or a combination of both. In other examples, fiber cables may be run to the home and the test instrument 100 may connect to the fiber cables.

The test instrument 100 may be connected to the cable network 101 at a desired test point to test signals (upstream and/or downstream) passing through the test point. The test instrument 100 is shown as connected at test point 105. The test instrument 100 may be connected at any location where connections are available to connect to the network 101. For example, the test instrument 100 is connected to the network 101 via a test access point (tap) to measure signals flowing through the tap. The tap for example is a 3 port hardware device and one port is monitor port connectable to the test instrument 100 to measure signals in the network passing through the tap. The tap may provide more than test point access. For example, the tap may be a hardware device that 'taps" off the line and feeds one or more customer premises and is where the test instrument 100 can be connected.

The test instrument 100 may include one or more ports to connect to the test point 105. In an example, the port(s) include coaxial RF cable connectors. It will be appreciated that test instrument 100 may also have other non-cable ports, for example to connect to a computer or to an external display, such as but not exclusively one or more USB ports and the like.

The test instrument 100 is inserted for example by coupling a port of the test instrument 100 to a cable in the network 101. In this manner, signals in the network are received at the test instrument 100. The test instrument 100 for example may include a dual port test instrument. For example, one port may be connected downstream such as toward a customer premises, and one port may be connected upstream towards a network node. Signals (e.g., upstream or downstream) in the network may flow through the test instrument 100 and may be measured. In another example, the test instrument 100 may be a single port device. For example, the test instrument 100 is connected to the network 101 via a tap to measure signals flowing through the tap at the test point 105. The tap for example is a 3 port hardware device and one port is monitor port connectable to the test instrument 100 to measure signals in the network passing through the tap. A dual port test instrument may also be connected to a tap.

Figure 2A:
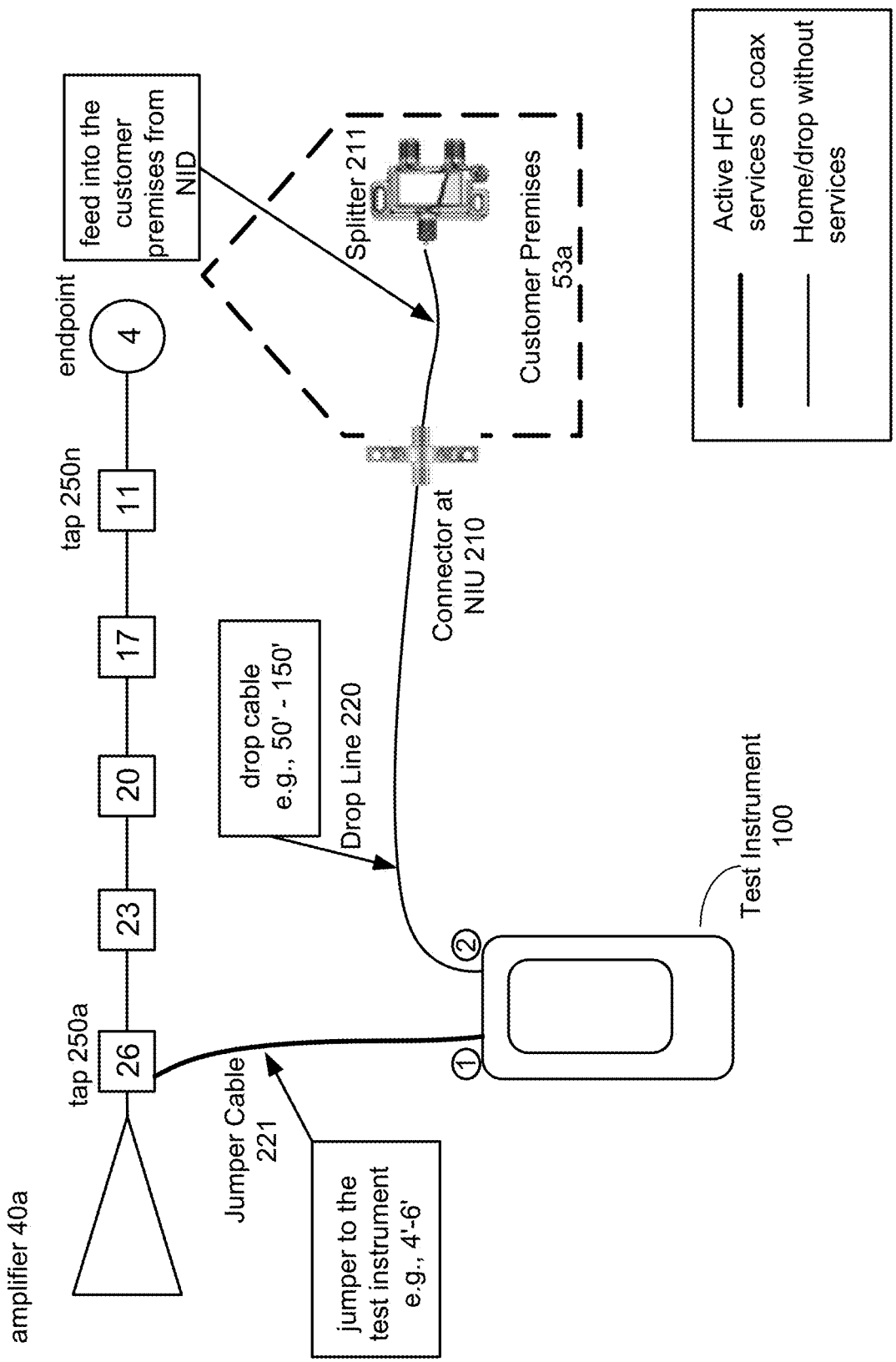
FIGS. 2A-B illustrates multiple test points, according to examples of the present disclosure.
Figure 2B:
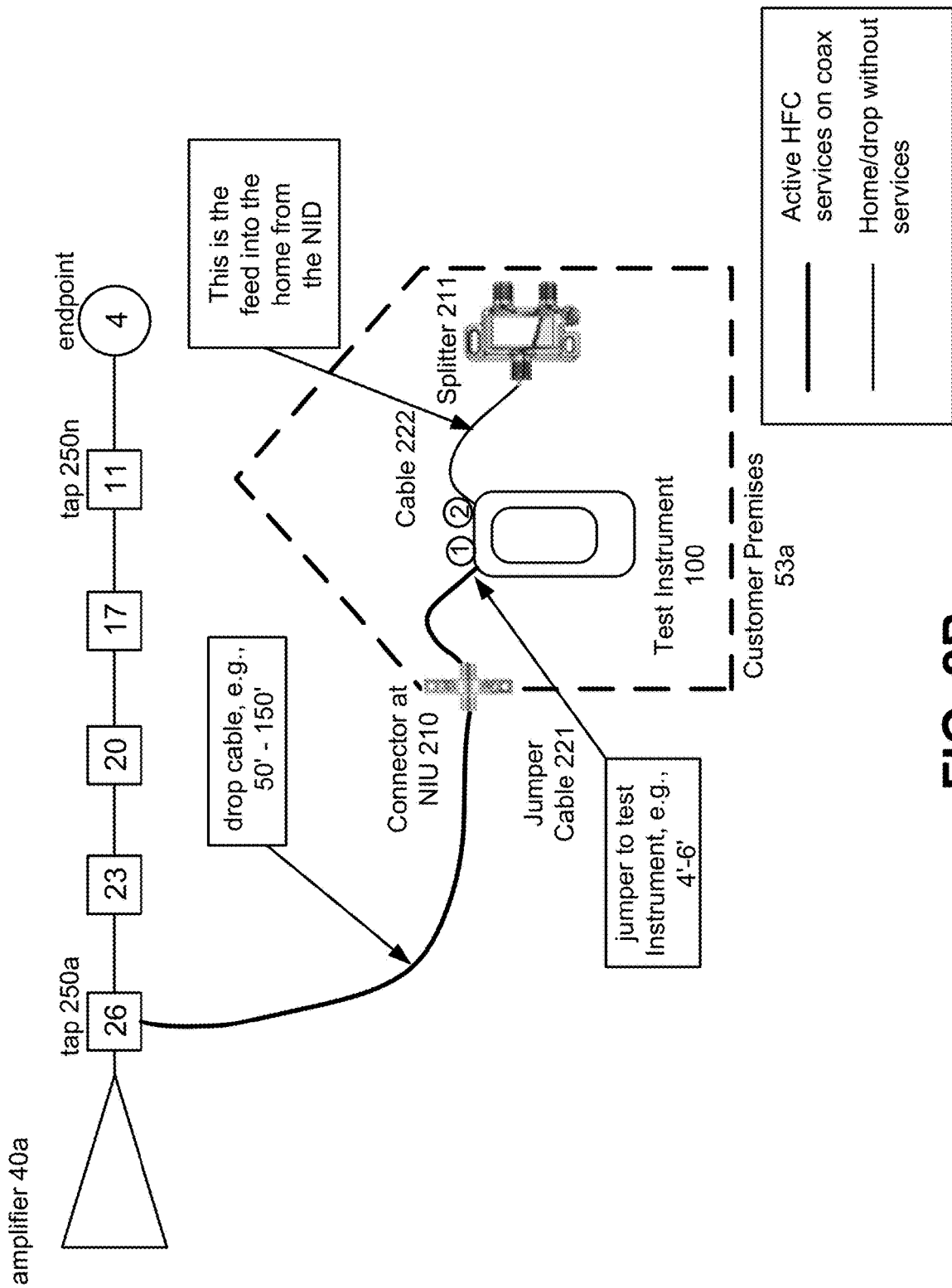

FIGS. 2A-B show examples of connecting the test instrument 100 at different test points. FIG. 2A shows the test instrument 100 connected to a tap 250a in a portion of the network 101 between amplifier 40a and customer premises 53a. There may be multiple taps 250a-n and the values (e.g., 26, 23, 20 . . . ) shown for the taps 250a-n are examples of tap values, e.g., attenuation measured at the tap, in decibels. The downstream signal is significantly attenuated by the time it reaches the endpoint, which may be a customer premises. A customer premises may also be connected via a drop line, also referred to as a trunk line, at each tap. Drop line 220 is shown connected to the customer premises 53a. The test instrument 100 in this example is dual port device with ports 1 and 2. Port 1 is connected via a jumper cable 221, e.g., 4-6 feet coaxial cable, to the tap 250a. Port 2 is connected to network interface unit (NIU) 210 of customer premises 53a. The NIU 210, also referred to as a network interface device, typically is attached to the outside of the customer premises and is where the drop line connects to the in-home or in-customer-premises wiring. The NIU 210 is typically connected to a ground block and ground block measurements can be taken at the NIU 210. The splitter 211 may be in the customer premises 53a and is an impedance that reflects a reflectometry pulse output from the test instrument 100 as is further described below.

Connecting the test instrument 100 as shown in FIG. 2A can be used to test wiring and signals at the tap 250a, which may be at a node or telephone pole. For example, a reflectometry pulse is output at port 2 from the test instrument 100 to determine whether there is any impairments, such as broken cable, in the drop line 220. Although a dual port test instrument is shown, the test instrument 100 may be a single port device. For example, the single port may be connected to the drop line 220 to measure signals on the drop line 220.

FIG. 2B also shows the test instrument 100 connected at a different test point, such as between the NIU 210 and the splitter 211. From this test point, the test instrument 100 may take measurements to identify impairments at the customer premises 53a. Similarly to FIG. 2A, prior to taking measurements to detect the impairments, the test instrument 100 determines whether port 2 is connected to a cable of a predetermined minimum length, such as the cable 222 connected to splitter 211 and may also determine if the signature of a reflected signal received at port 2 is different than a previous signature and/or specific to the current location or customer premises. FIGS. 2A-B give two examples of test points. Tests may be performed at other locations as discussed above.

Figure 3A:
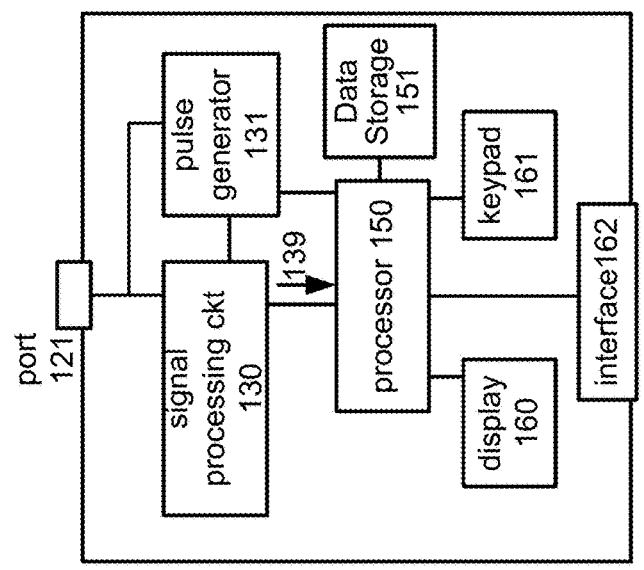
FIGS. 3A-B illustrate a single port and a dual port test instrument, according to examples of the present disclosure.
Figure 3B:
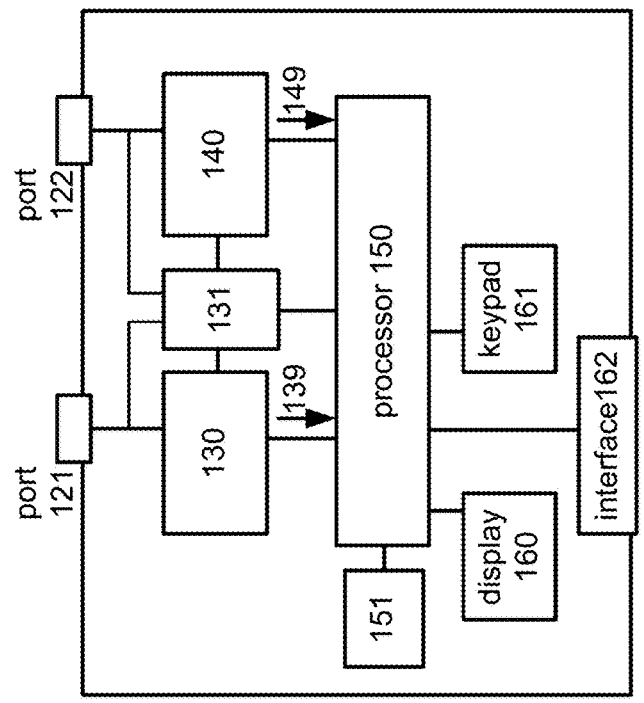

FIGS. 3A-B show examples of components of the test instrument 100, according to an example. FIG. 3A shows an example of the test instrument 100 as a single port device with only port 121 to connect to network 101 to measure signals in the network 101, and FIG. 3B shows an example of the test instrument 100 as a dual port device with ports 121 and 122 to connect to the network 101 to measure signals. As shown in FIG. 3A, a signal processing circuit 130, which may be connected to the port 121, is configured for processing signals from the network 101 that are received via the port 121 to obtain measurement data 139. A pulse generator 131 (e.g., TDR or FDR) generates reflectometry pulses which are output via port 121 and are reflected back to the port 121 from impedances in the network 101. The reflected pulses, also referred to as reflected signals, are upstream signals measured by the signal processing circuit 130 to generate measurement data 139. Downstream signals, such as downstream signals 11 shown in FIG. 1, may also be measured to generate measurement data 139. A control processor 150 may be communicatively coupled to the signal processing circuit 130 and is configured to process the measurement data 139 and make the determinations described herein, such as to determine problems and suggested actions. The processor 150 may display measurements and notifications on display 160. A keypad 161, touch screen or another I/O device may be provided to receive user input. Interface 162 may include one or more communication interfaces, such as USB, Bluetooth, WiFi, etc. The signal processing circuit 130 and processor 150 may be embodied using a single dedicated or shared hardware processor or using multiple hardware processors, and/or a combination of software and hardware. Examples of hardware processors that may be used to implement the components including a digital signal processor (DSP), application specific integrated circuit (ASIC), field programmable gate array (FPGA), network processor, system on a chip, microprocessor, Complex Programmable Logic Device (CPLD), erasable programmable logic device (EPLD), simple programmable logic device (SPLD), or macrocell array. Data storage 151 may store measurement data, signatures or any information used by the test instrument 100. In an example, one or more of the functions and steps of the methods may be performed by the processor 150 or other hardware executing machine readable instructions stored in a non-transitory computer readable medium, such as the data storage 151. The data storage may comprise RAM (random access memory), ROM (read only memory), EPROM (erasable, programmable ROM), EEPROM (electrically erasable, programmable ROM), hard drives, flash memory, or other types of storage devices, which may be volatile and/or nonvolatile.

FIG. 3B is similar to FIG. 3A but includes additional port 122 connectable to the network 101. Signal processing circuit 140 for processing signals from the network 101 that are received via the port 122 to obtain measurement data 149. For example signal processing circuit 130 processes upstream signals, and signal processing circuit 140 processes downstream signals. Processor 150 process the measurement data 139 and 149 to make determinations described herein. The ports 121 and 122 allow the test instrument 100 to connect simultaneously to an upstream portion of the network 101 and to a downstream portion of the network 101. The port 121 receives upstream signals and the port 122 receives downstream signals, and measurement data 139 is upstream measurement data and measurement data 149 is downstream measurement data. The test instrument 100 may perform parallel measurements on the upstream and downstream signals 111, 112 respectively, and the measurement results simultaneously displayed.

Figure 4:
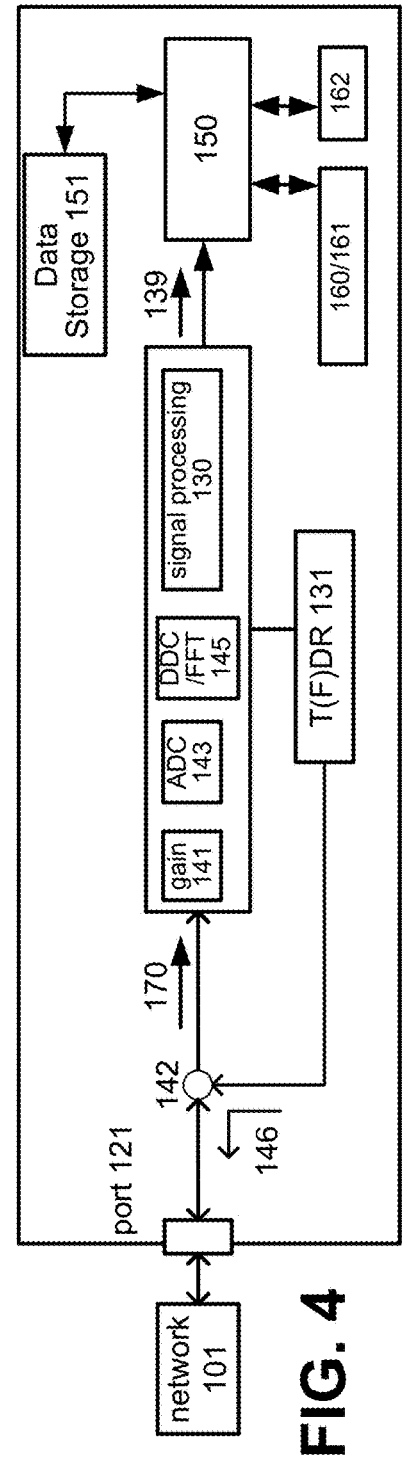
FIG. 4 illustrates circuit components of a single port test instrument, according to an example of the present disclosure.

FIG. 4 shows additional details of the components of the test instrument 100 shown in FIG. 3A for the single port example. FIG. 4 shows pulse generator 131, which may be a TDR or FDR reflectometer. The pulse generator 131 may be coupled to the signal processing circuit 130 and the port 121. The pulse generator 131 injects a probe signal (e.g., reflectometry pulse 146) into the network 101 through a coupler or switch 142 and port 121. The signal processing circuit 130 may include reflectometer control logic for controlling the operation of pulse generator 131 and processing measurement results.

The components may include an optional gain control unit 141 that is operationally followed by an Analog to Digital Converter (ADC) 143, a Digital Downconverter/Fast Fourier Transform (DDC/FFT) unit 145, and signal processing circuit 130. The DDC/FFT logic 145 may be configured to obtain a frequency spectrum of signal 170 (e.g., reflected signal) within the frequency band of transmission, for example by performing the FFT of 170, and/or to tune to an active channel using digital down-conversion. The active channel to tune to may be selected, for example, by a user command or automatically by internal tester programming, and communicated to the DDC/FFT logic 145 by the control processor 150 and/or the signal processing circuit 130.

The measurement data 139 related to signal 170 may include signal characteristics. The measurement data 139 may include frequency of each channel detected in the signal 170, and may also include channel diagnostic information for one or more of the detected or active channels. The channel diagnostic information may include at least one of the following channel parameters or characteristic: signal level of the detected downstream channel, a modulation type of the detected downstream channel, signal-to-noise (SNR) for the channel, bit error ratio (BER) for the detected channel, modulation error ratio (MER) for the detected channel, ingress under the carrier, in Channel Frequency Response (ICFR), adaptive equalization coefficients, Digital Quality Index (DQI), etc.

Figure 5:
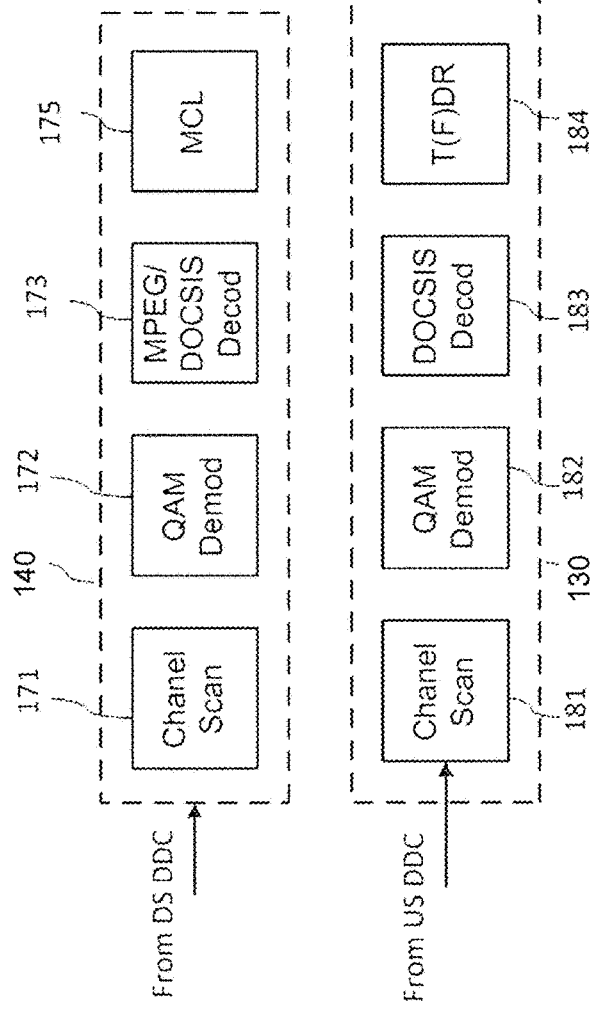
FIGS. 5 and 6 illustrates circuit components of a dual port test instrument, according to examples of the present disclosure.

FIG. 5 shows details of the signal processing circuits 130 and 140 in the dual-port test instrument shown in FIG. 3A. Signal processing circuit 140 for processing downstream signals may include a frequency scan logic 171 for controlling the DDC/FFT and obtaining active channel data therefrom, and a QAM demodulator 172 for demodulating the selected downstream channel; the QAM demodulator 172 may include an adaptive equalizer. MPEG/DOCSIS decoder 173 decodes a demodulated signal received from the QAM demodulator 172. Measurement control logic (MCL) 175 may read various performance-related data from the MPEG/DOCSIS decoder 173, the QAM demodulator 173 and the channel scan control logic 171 to perform a variety of service level tests and to obtain the downstream signal characteristics. Obtaining the signal characteristics is further described in for example U.S. Pat. Nos. 5,751,766, 6,061,393, 6,385,237 and 7,792,183. By way of example, the MCL 175 may be configured to use output from the DDC/FFT for measurements of analog or digital channel level, downstream frequency response, constellation plots, and ingress under the carrier. Alternatively, the two later measurements can be performed by querying the QAM demodulator 172. MCL 175 may also query control registers of the DDC/FFT to obtain DDC gain values, which may then be used for computing carrier level parameters and the like. The MPEG/DOCSIS decoder 173 may have rate counters and packet error counters that may be read by MCL 175 to measure pre-FEC and post-FEC Bit Error Rate (BER), and MPEG data stream errors or error rates for the selected DS channel. The channel scan logic 171 may be configured to operate under the control of MCL 175, as auto-detection logic.

Signal processing circuit 140 may include frequency scan logic 181 for controlling the DDC/FFT and obtaining active channel data therefrom, and a QAM demodulator 182 for demodulating the selected upstream channel; the QAM demodulator 182 may include an adaptive equalizer. DOCSIS decoder 183 decodes demodulated signal received from the QAM demodulator 182. Measurement control logic (MCL) 185 reads various performance-related data from the DOCSIS decoder 183, the QAM demodulator 183 and the channel scan control logic 181 to perform a variety of service level tests and to obtain the upstream channel characteristics, as generally described above. T(F)DR 184 for example controls the pulse generator 131 to generates TDR or FDR pulses.

Figure 6:
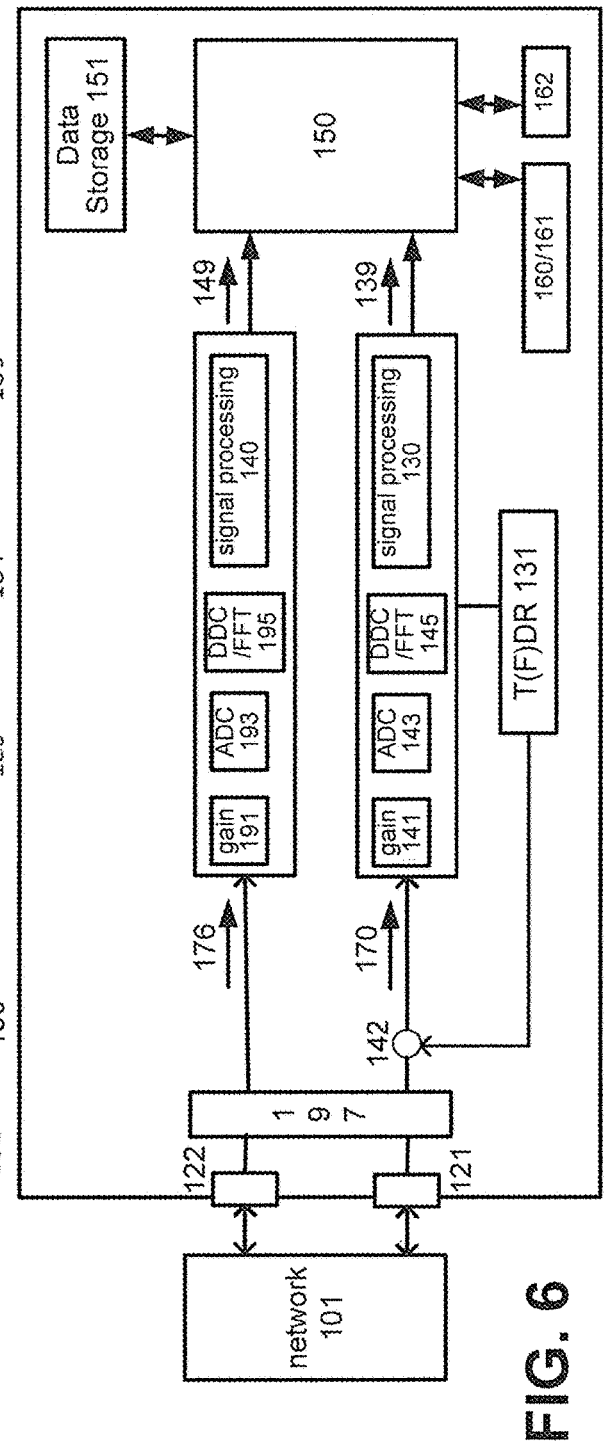

FIG. 6 is similar to FIG. 4 but shows the components for the dual-port test instrument of FIG. 3B. FIG. 6 includes some of the same components of FIG. 4 for measuring the upstream signals, such as signal 170. FIG. 6 also shows components for measuring downstream signals 176. Gain 191, ADC 193 and DDC/FFT 195 operate similarly to gain 141, ADC 143 and DDC/FFT 145. Also, port switch 197 may be disposed operatively between ports 121 and 122 on one side and signal processing circuits 130 and 140 on the other side, and may be configured for pair-wise connecting the ports 121 and 122 to the signal processing circuits 130 and 140 for supporting port auto-routing.

FIG. 7 illustrates a method 700 for detecting a problem and determining a suggested action from correlated measurements. The method 700 and other methods described herein are described by way of example as being performed by the test instrument 100 shown in FIGS. 1-6, but the methods may be performed by other test instruments. Also, one or more steps may be performed in different orders or substantially simultaneously.

At 701, at least one signal from the network 101 is measured by the test instrument 100 at one or more test points to determine measured characteristics of the at least one signal. The at least one signal may include upstream signals and/or downstream signal. For example, for upstream signal measurements, the pulse generator 131 generates reflectometry pulses (e.g., TDR or FDR pulses) which are output via a port, such as port 121. For example, the reflectometry pulses are output downstream in the network 101, such as towards a customer premises or internally in the customer premises. The reflectometry pulses are reflected by impedances and characteristics of the reflected signals, such as amplitude and reflection time, i.e., the time it takes for the pulse to return to the port, signal level, frequency response, etc. are measured to detect impairments. Upstream signal characteristics may also be measured. For example, the port 122 may be connected to the network 101 to receive upstream signals which are measured.

The test instruments 100 may run multiple tests that determine multiple characteristics of the measured signals for identifying problems on a channel. According to an example, the multiple tests are automatically run in the background, and the running of the tests may be invoked by the user clicking a button on the test instrument, which is further described in the examples discussed below. Examples of signal characteristics measured by the tests include power level, adjacent channel power level, smart scan for tilt and system levels, Bit Error Ratio (BER) and Modulation Error Ratio (MER), Digital Quality Index (DQI), Ingress Under Carrier, Equalizer—Echos, In Channel Response, Group Delay, Digital Hum, Automatic Gain Control (AGC) Stress, Constellation Analysis—coherent interference, and channel noise. The signal characteristics may be measured in a predetermined order (or user-selected) or substantially simultaneously.

Figure 8A:
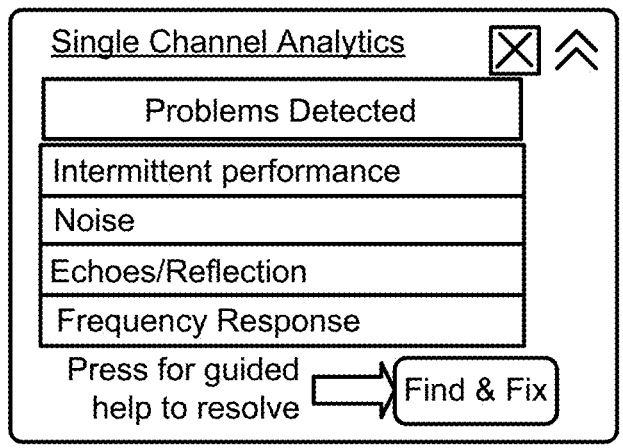
FIGS. 8A-B show results for single channel and multi-channel analytics, according to examples of the present disclosure.

The test instrument 100 may measure signal characteristics for a single channel or multiple channels. FIG. 8A shows an example of information that may be presented on the display 160 by the processor 150 for single channel problem detection. As shown, the problems detected from the measured signal characteristics may include intermittent performance, noise, echo/reflection, and frequency response. A button may be pressed by a user for suggested actions.

Figure 8B:
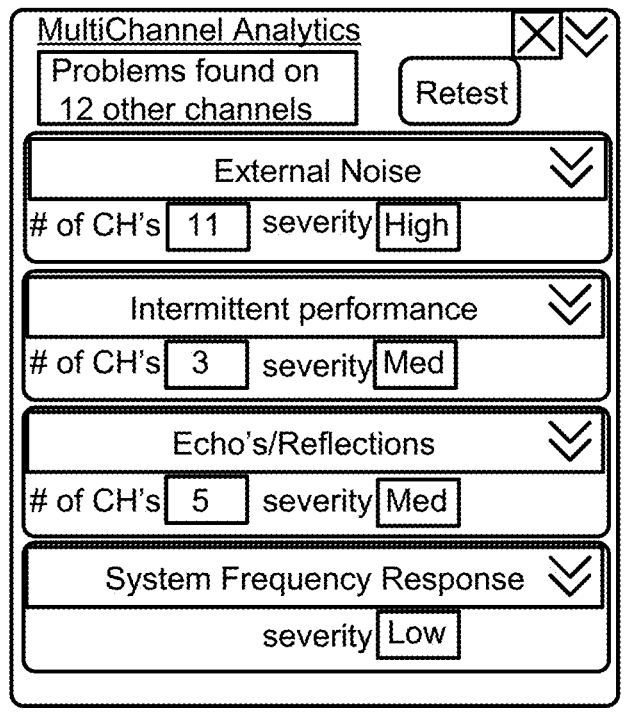

For multi-channel testing, the test instrument 100 may scan through channels and measure characteristics for the different channels in order to identify problems in the network 101 that the user might not presently be focused on. To identify problems faster, the test instrument 100 may prioritize both the measurements (i.e., the measurement of the signal characteristics) and the channels that are measured. The user may select the order for measuring the channels and/or the order for measuring the signal characteristics or the orders may be predetermined. The processor 150 can provide visual feedback of the progress and present the measurements, detected problems, suggested actions, etc., on the display 160 as the measurements are performed on the channels. Thus, the user does not have to wait until completion to take action, and the user can stop the measurements and take action as needed. The test instrument 100 can save the measurements and allow the user to retest and compare, which may be performed through a guided process. FIG. 8B shows an example of information that may be displayed on the display 160 for multi-channel testing. It provides visual feedback of the testing prior to and after completion of the testing of each channel. For example, the visual feedback may indicate for each problem detected or checked, the number of channels and severity of the problem. Also, a retest button may be provided to facilitate the retest.

Also, as discussed above, the measurements may be performed at different test points. Test points may include but are not limited to the tap, ground block and customer premises.

At 702, the measured characteristics are correlated to detect one or more problems in the network 101 and determine a suggested action for each problem. Measurements performed for a particular channel at one or more locations (i.e., test points) may be correlated, and the measurements may be for upstream and/or downstream signals. Correlating the measured characteristics may include determining a relationship between a plurality of the measured characteristics that may be indicative of a problem in the network 101. In an example, the relationships are determined and stored in a table. A table is any data structure that can store the relationships. A lookup may be performed on the table to detect a problem based on the measured characteristics and a suggested action corresponding to the problem.

The table may include subsets of measured characteristics that are indicative of different problems and corresponding suggested actions. For example, each subset of measured characteristics that are out of tolerance are associated with a particular problem and a suggested action. An out of tolerance characteristic may be greater than or less than a predetermined threshold and if the threshold is exceeded it may be at least partially indicative of a problem. A subset of measured characteristics may include a plurality of the measured characteristics but may be less than all the measured characteristics.

FIGS. 9A-C illustrate examples of portions of a table that may be used to identify problems and suggested actions based on subsets of measured characteristics that are out of tolerance. FIG. 9A shows a portion of a table related to a detected signal quality problem 903 and is for measured characteristics 901 that are measured at the tap and other test points. As shown, the measured characteristics may include measurements for digital and analog signals. For the signal quality problem 903, the subset of measured characteristics are shown as 902 and are marked with an "X", e.g., MER, BER, and C/N (channel noise). If these measured characteristics are out of tolerance, it is indicative of a signal quality problem. The table also includes suggested actions, examples of which are shown in FIG. 9A. Suggested actions 904 are the suggested actions that may be presented if the signal quality problem is detected.

FIGS. 9B and 9C are for measured characteristics that are measured at the ground block and at the customer premises, respectively. FIGS. 9B and 9C also show the subset of out of tolerance characteristics 912 and 922 that are indicative of a signal quality problem at the respective test point. Suggested actions 914 and 924 are also shown and may be different for different test points. Multiple suggested actions may be associated with a single detected problem.

To determine the detected problem and the associated suggested action, the out of tolerance measured characteristics are determined. A lookup may be performed in the table with the out of tolerance measured characteristics to determine whether they are in a subset of measured characteristics for a problem. If the out of tolerance measured characteristics are in a subset of measured characteristics for a problem, the problem associated with the subset is the detected problem and an associated suggested action is determined from the table. In an example, all the measured characteristics in the subset must be out of tolerance to be indicative of the problem. For example, all of MER, BER and C/N must be out of tolerance to be indicative of a signal quality problem. In another example, a majority or multiple of the measured characteristics in the subset must be out of tolerance to be indicative of the associated problem. The results of the lookup for example include the detected problem or problems and one or more suggested actions for each detected problem.

At 703, any problems that are determined and one or more suggested actions for each problem are displayed on the display 160. Also, the out of tolerance characteristics, determined problems and associated suggested actions may be transmitted to a remote computer such as via the communications interface 162.

The table discussed above with respect to 702 may be stored at the test instrument 100, such as in the data storage 151. The measurements are performed for example by signal processing circuits 130 and 140, and the processor 150 may identify measured characteristics that are out of tolerance. The processor 150 may determine whether there is a problem that is associated with the out of tolerance characteristics, such as described above, based on information in the table, and identify one or more suggested actions for each determined problem from the table. The measured characteristics, problems and suggested actions may be displayed on the display 160.

The analysis of the measured characteristics may also be performed by a remoter computer. For example, the processor may send the measured characteristics and/or an indication of the out of tolerance characteristics to the remote computer via the communications interface 162 in a request for problem detection. The remote computer may store the table and perform a lookup in the table to identify any problems and corresponding suggested actions, such as described above. The test instrument 100 may receive the identified problems and corresponding suggested actions via the communications interface 162 from the remote computer and display the information.

FIGS. 9A-C show examples of measured characteristics that are indicative of a signal quality problem. The table may store subsets of measured characteristics for other problems and corresponding suggested actions. Some examples of other identifiable problems that may be stored in the table include but are not limited to downstream ingress, level deviations, distortions/echoes/reflection, in band AGC problem, headend modulator problem, voltage problem, bad CPE, downstream packet loss, downstream throughput, upstream packet loss, upstream ingress, upstream ICFR, transmission levels and throughput, and DOCSIS problems.

Figure 10:
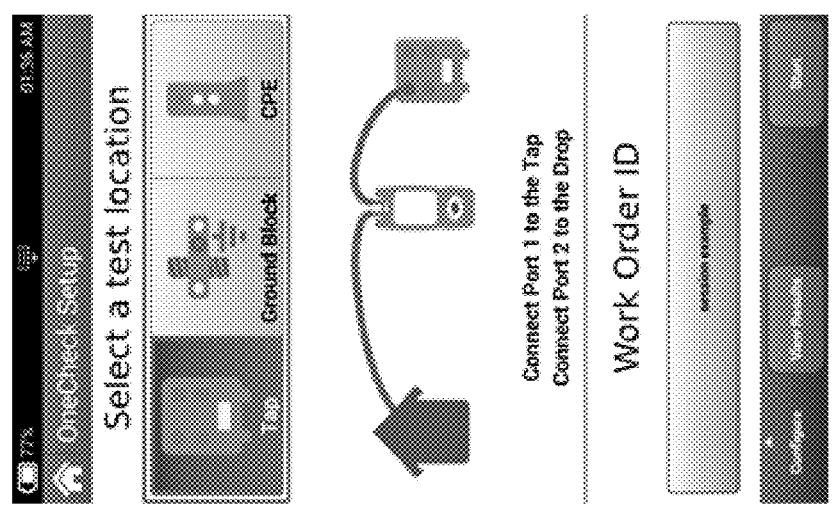

FIGS. 10-14 show examples of screen shots that may be generated by the processor 150 and displayed on the display 160 of the test instrument 100. As discussed above, the test instrument 100 may execute multiple tests for a session. The tests may be invoked by a user entering information for the session in the test instrument and clicking a button to invoke the measurements for a test point. FIG. 10 shows a screen for entering the test location, which is the tap in this example, and entering a work order ID, also referred to as a session ID. Then, the user may click the start button to execute the tests to measure the signal characteristics.

Figure 11:
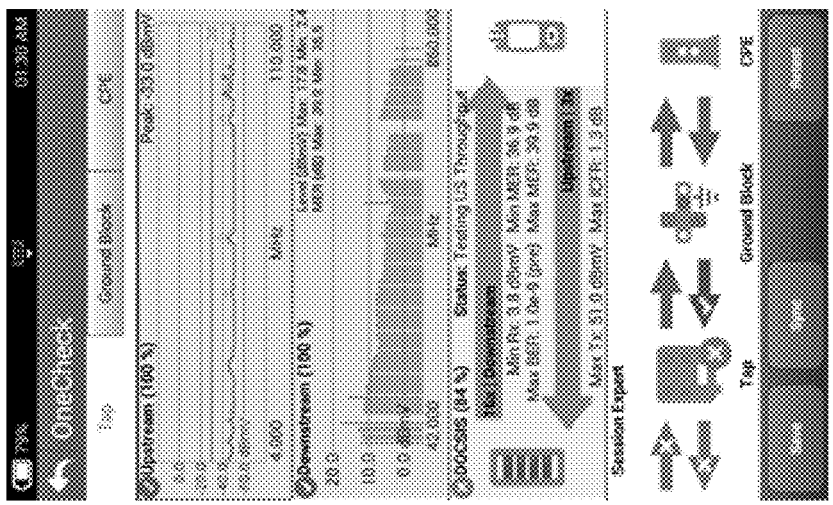

As shown in FIG. 11, after the user starts the tests, they are presented with a summary dashboard of the automated test results and a summary panel of the session (shown as Session Expert at the bottom). For example, the summary panel includes arrow summarizing indicating the service performance at various test points. The arrows indicate which direction the impairments are coming from, upstream or downstream, and also show the pass/fail or health of the service, which may be indicated by color (green and check mark for Okay, Red and X for Bad, or Greyed out for portions not tested). Additional details may be displayed by selecting the summary panel, either by touching on the touchscreen or navigating via keypad and selecting enter with the keypad. Upon selecting the summary panel, the user is provided with a top level summary of the problems detected and the suggested actions.

FIG. 12 shows an example of session details including problems detected and suggested actions for the tap test point, and FIG. 13 shows problems detected and suggested actions for the ground block test point. The user has the ability to choose a different test point, such as tap, ground block or CPE, by selecting the tab at the top of the screen to view the problems detected at other test points.

The user may also be provided with additional details and analysis based on the tests performed at multiple test points. One measurement in particular is identifying problems in the drop (the coaxial cable between the TAP and Ground Block) based on background TDR or FDR measurements. These results are provided to the technician in a panel within the detailed view, such as shown in FIG. 14.

Although not shown, the test instrument 100 may generate displays for drop analysis which may be performed by TDR or FDR reflectometry. For example, pattern matching of unique reflections identified at the ground block and tap are performed. Also, the distance estimates are determined to estimate the length of the drop. The signatures and other measurements may be displayed for comparison. Additionally, the test instrument may display test results for multiple test points on a single screen for easy comparison.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims and their equivalents in which all terms are meant in their broadest reasonable sense unless otherwise indicated.

What is claimed is:

1. A network signal testing device comprising:
   at least one port connectable to at least one test point in a network;
   a measurement circuit to measure a plurality of characteristics of at least one signal received on the at least one port via the at least one test point;
   a processing circuit to determine a problem and a proposed action for the problem based on correlating the plurality of measured characteristics and tolerance characteristics, wherein:
   a table of a plurality of subsets of the plurality of measured characteristics and a corresponding problem and proposed action for each subset is stored in storage, and
   correlating the plurality of measured characteristics and tolerance characteristics is to detect a problem in the network and to determine a proposed action for the problem, the correlating comprising:
   detecting a plurality of the measured characteristics that are out of tolerance;
   identifying the problem from the table that is based on the out of tolerance characteristics; and
   identifying the proposed action from the table that corresponds to the problem; and
   a user interface including a display, wherein the processing circuit displays the problem and the proposed action on the display.

2. The network signal testing device of claim 1, wherein the at least one test point comprises a plurality of test points, and the measurement circuit is to measure the plurality of characteristics of at least one signal received at each test point, and the plurality of characteristics for the signals received at the plurality of test points are correlated to determine the problem and the proposed action.

3. The network signal testing device of claim 2, wherein the at least one signal comprises an upstream signal and a downstream signal received through at least one of the plurality of test points.

4. The network signal testing device of claim 1, wherein the plurality of characteristics comprises a plurality of power level, adjacent channel power level, system levels, Bit Error Ratio (BER) and Modulation Error Ratio (MER), Digital Quality Index (DQI), ingress under carrier, echoes, in channel response, group delay, digital hum, Automatic Gain Control (AGC) stress, coherent interference, and channel noise.

5. The network signal testing device of claim 1, wherein measurement circuit measures the plurality of characteristics in a predetermined signal characteristic order for at least one channel.

6. The network signal testing device of claim 5, wherein the at least one channel comprises a plurality of channels, and the measurement circuit measures the plurality of characteristics for the plurality of channels in a predetermined channel order.

7. The network signal testing device of claim 6, wherein the processing circuit displays on the display visual feedback of progress of problem detection as the measurement circuit measures the plurality of characteristics for the plurality of channels.

8. The network signal testing device of claim 7, wherein the visual feedback comprises displaying problems associated with the plurality of characteristics as the plurality of characteristics are measured, and the processing circuit is to receive user input via the user interface to stop the measurements of the plurality of characteristics for the plurality of channels and display results prior to completion of the measurements for the plurality of channels.

9. The network signal testing device of claim 1, wherein the proposed action comprises guided operations to perform to correct the problem.

10. The network signal testing device of claim 1, wherein the processing circuit invokes the measurement of the plurality of characteristics of the signal in response to receiving an input via the user interface to test the signal.

11. The network signal testing device of claim 1, comprising:

a communications interface, wherein the processing circuit is to send the plurality of measured characteristics to a remote computer via the communications interface.

12. A method of testing a signal transmitted in a network, the method comprising:
   measuring a plurality of characteristics of a signal received on at least one port of a test instrument connected to the network through at least one test point;
   correlating the plurality of measured characteristics and using tolerance characteristics to detect a problem in the network and determine a proposed action for the problem;
   storing a table of a plurality of subsets of the plurality of measured characteristics and a corresponding problem and proposed action for each subset; and
   presenting, via a display of the test instrument, the detected problem and the proposed action;
   wherein correlating the plurality of measured characteristics to detect a problem in the network and determine a proposed action for the problem comprises:
      detecting a plurality of the measured characteristics that are out of tolerance;
      identifying the problem from the table that is based on the out of tolerance characteristics; and
      identifying the proposed action from the table that corresponds to the problem.

13. The method of claim 12, wherein the characteristics are measured for signals received at a plurality of test points, and the measuring comprises:
   receiving a session ID for a session;
   receiving test point information for each test point;
   receiving user input to start testing for each test point; and
   measuring the plurality of characteristics of a signal received through each test point in response to receiving the user input to start testing.

14. The method of claim 12, comprising:
   storing a table of a plurality of subsets of the plurality of measured characteristics and a corresponding problem and proposed action for each subset;
   wherein correlating the plurality of measured characteristics to detect a problem in the network and determine a proposed action for the problem comprises:
      detecting a plurality of the measured characteristics that are out of tolerance;
      identifying the problem from the table that is based on the out of tolerance characteristics; and
      identifying the proposed action from the table that corresponds to the problem.

15. A test instrument connectable to a network, the test instrument comprising:
   at least one port connectable to test points in the network;
   a measurement circuit to measure characteristics of signals from the network that are received on the at least one port via the test points;
   a user interface to receive user input and display information associated with the measured characteristics; and
   a processing circuit to
      receive user input to start testing at each of the test points;
      facilitate the measurement circuit to measure the characteristics of the signals at each test point in response to the user input;
      determine a problem and a proposed action for the problem based on the measured characteristics and tolerance characteristics, wherein determining the problem and the proposed action comprises:
         detecting a plurality of the measured characteristics that are out of tolerance;
         identifying the problem from the table that is based on the out of tolerance characteristics; and
         identifying the proposed action from the table that corresponds to the problem; and
      display, on the user interface, the problem and the proposed action; and
   storage to store a table of a plurality of subsets of the plurality of measured characteristics and a corresponding problem and proposed action for each subset.

16. The test instrument of claim 15, comprising:
   a data storage to store information comprising a plurality of subsets of the plurality of measured characteristics and a corresponding problem and proposed action for each subset;
   wherein to determine a problem and a proposed action, the processing circuit is to:
      detect a plurality of the measured characteristics that are out of tolerance;
      identify the problem from the stored information based on the out of tolerance characteristics; and
      identify the proposed action from the stored information that corresponds to the problem.

17. The test instrument of claim 15, comprising:
   a communications interface to connect the test instrument to a remote computer, wherein to determine the problem and the proposed action, the processing circuit is to:
   detect a plurality of the measured characteristics that are out of tolerance;
   send a request to the remote computer via the communications interface to determine the problem and proposed action, wherein the request identifies the plurality of the measured characteristics that are out of tolerance, and the remote computer performs a lookup on a stored table based on the plurality of the measured characteristics that are out of tolerance to identify the problem and proposed action;
   receive the results of the lookup via the communications interface from the remote computer; and
   determine the problem and the proposed action from the results.

18. The test instrument of claim 15, wherein the signals measured at each of the test points comprise upstream and downstream signals.

19. The test instrument of claim 18, comprising:
   a pulse generator to output a reflectometry pulse to the at least one port, and the upstream signals include a reflectometry pulse reflected from an impedance back towards the at least one port.

20. The test instrument of claim 19, wherein the reflectometry pulse comprises a time domain reflectometry pulse or a frequency domain reflectometry pulse.

* * * * *